Patented June 27, 1933

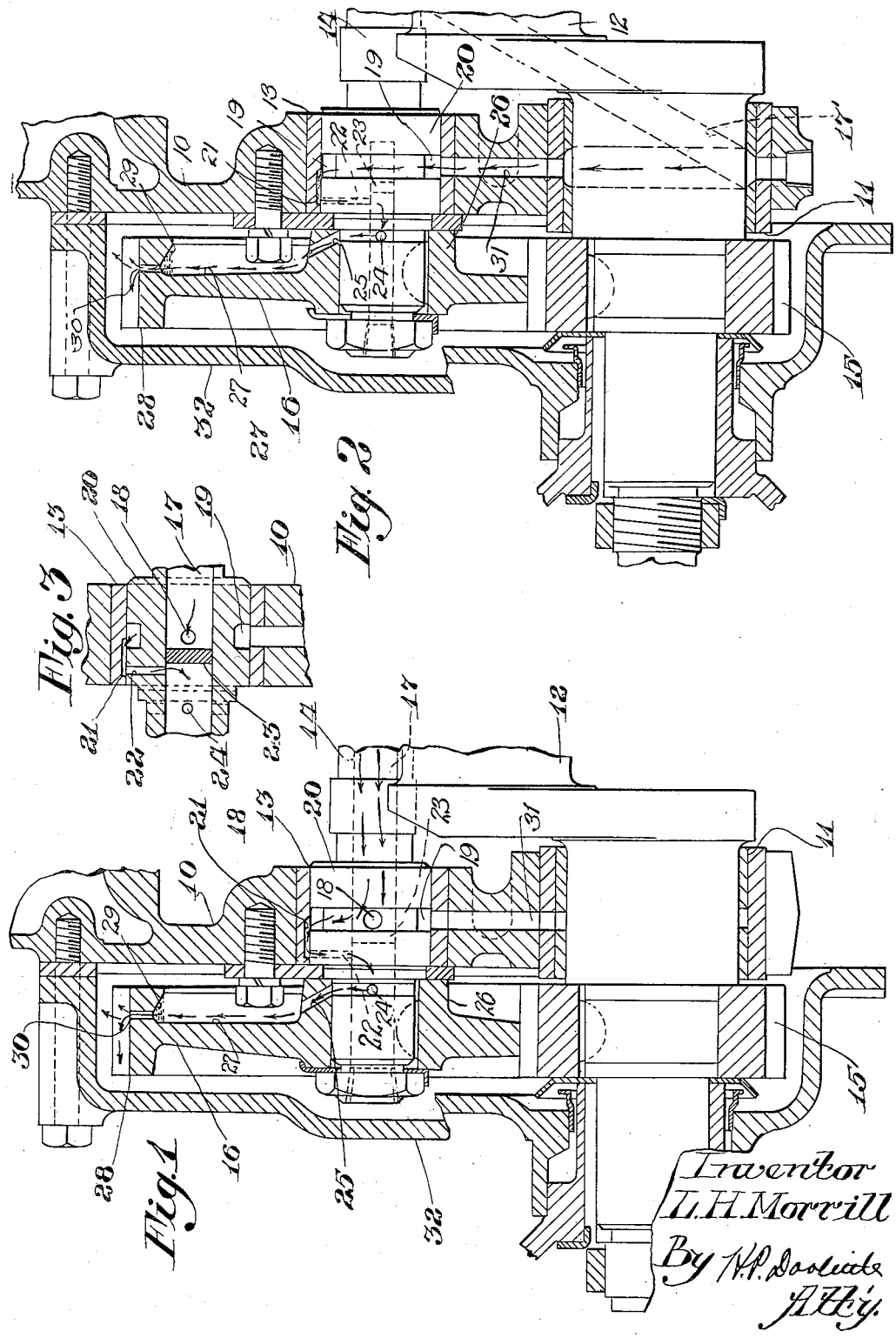

1,915,330

UNITED STATES PATENT OFFICE

LEWIS H. MORRILL, OF FORT WAYNE, INDIANA, ASSIGNOR TO INTERNATIONAL HARVESTER COMPANY, A CORPORATION OF NEW JERSEY

TIMING GEAR LUBRICATION FOR ENGINES

Application filed January 13, 1930. Serial No. 420,492.

This invention relates to internal combustion engines and especially to an improved structure for effectively lubricating the intermeshing surfaces of the timing gears for such an engine.

The objects of the invention are to provide simple and effective structure for supplying lubricant to the timing gears; to provide such structure which includes an intermittent control mechanism for directing the lubricant to these gears in such a manner that overlubrication cannot take place; and, lastly, generally to improve the lubrication of timing gears for an engine.

Briefly, these desirable objects are achieved in an engine having a crank shaft and a cam shaft with timing gears connecting the same, one of said shafts having an axial oil feed duct communicating with appropriate passages to distribute the oil centrifugally from the hub of one of said gears to the gear surfaces, there being a control device for intermittently feeding oil in a manner best to prevent an over supply of oil to the gear surfaces which are to be lubricated.

In the drawing illustrating preferred examples of this invention,—

Figure 1 is a vertical side sectional view through the timing gear mechanism of an internal combustion engine showing the improved oiling means;

Figure 2 is a similar showing of a modified form of the oil distributing structure; and, Figure 3 is a detached, vertical, sectional view through the control mechanism for regulating the supply of oil.

A fragment of an internal combustion engine block having an end wall 10 is shown, which wall carries a bearing 11 for journaling one end of the crank shaft 12. The wall 10 also carries a bearing 13 in which is journaled the usual cam shaft 14.

Exteriorly of the wall 10, the crank shaft has keyed thereto a gear 15 which meshes with a larger gear 16 exterior of the wall 10 and keyed to the cam shaft 14 in any appropriate manner.

In the showing of Figures 1 and 3, the cam shaft is provided with an axial duct 17, which in any appropriate manner is supplied with lubricant from the engine crank case and under pressure, by means of the usual pump mechanism (not shown) provided for that purpose. This duct 17 in the cam shaft, as shown in said Figures 1 and 3, leads to a radial passage 18 in said cam shaft, the passage 18 leading to an annular groove or relief 19 formed on an enlargement 20 of annular shape on said cam shaft. This enlargement 20 is journaled in bearings 13 heretofore mentioned, said bearing sleeve 13 having formed therein a trap or pocket 21 which communicates with the groove 19. As shown best in Figure 3, another radial passage 22 is provided through the enlargement 20 and leads back to the cam shaft duct 17, there being a partition wall or block 23 separating the passage 18 from the passage 22. The duct 17 in the cam shaft outside of the wall 10 is provided with a third radial passage 24, which leads to a radial and inclined passage 25 extending through the hub 26 of the gear 16. The passage-way 25 is arranged to deflect oil along a face 27 of the gear 16, as indicated by the arrows in Figure 1. The rim of this gear, shown at 28, is provided on its inner surface with an annular trough or groove 29 to receive the oil coming out centrifugally along the face 27 of the gear 16, and one or more radial openings 30 are provided in the rim of said gear to cause the oil from the trough 29 to be thrown out between the gear teeth in an obvious manner. Thus the oil is distributed over the gear teeth to lubricate the same.

The crank shaft bearing 11 receives the lubricant through a passage-way 31 leading from the groove 19, as shown in Figure 1. A cover 32 encloses the gearing, and oil dripping from the gear surfaces returns to the engine crank case sump in an obvious manner by dripping back thereinto.

The construction of Figure 2 is quite the same as that described in connection with Figure 1, the only difference being that here the cam shaft is solid and the primary oil feed duct 17 appears as 17′ disposed axially through the center of the crank shaft, the oil then going around the groove in the crank shaft bearing 11 through the passage-way 31 and then out the annular groove 19 in the intermittent supply regulator shown in Figure 3, and thereafter the oil passes to the gear surfaces in identically the same manner as shown and described in connection with Figure 1.

In operation, then, oil comes either through the cam shaft 14 or the crank shaft 12 under pressure from the oil pump, thence to the groove 19, through the radial passage-way 18, the oil being caught by the pocket 21 and distributed intermittently through the passage-way 22, as shown in Figure 3, to the cam shaft and then out radially through the passage-way 24 to the passage-way 25, then centrifugally out along the face 27 of the gear 16 to the annular trough 29 and finally out radially through one or more openings 30 to send the oil to the gear teeth surfaces. In connection with the radial passage-way 22 it will be understood that the same communicates with the pocket 21, once for every revolution of the cam shaft and its enlargement 20. Thus the oil feed must be intermittent as has been stated.

From this description it will be appreciated that simple and effective structure has been provided for lubricating the timing gears of an engine and that, due to the intermittent flow regulator in Figure 3, only a predetermined amount of oil can be fed, as governed by the pocket 21 and passage-way 22, this structure effectively preventing an over supply of lubricant.

It is the intention to cover all such changes and modifications of the form of the invention herein chosen for purposes of illustration as do not materially depart from the spirit of the invention as indicated by the definitions constituting the following claims.

What is claimed is:

1. In an engine having a wall, a crank shaft journaled therein, a cam shaft journaled in a bearing in said wall, a gear on the crank shaft, a gear having a hub on the cam shaft, said cam shaft having an axial oil feed duct therethrough, the cam shaft having a radial passage leading to an annular groove on the shaft, said groove communicating with a pocket in the cam shaft bearing, said pocket being in intermittent communication with another radial passage in the cam shaft leading back to the axial duct in the cam shaft, a division block between the two radial passages mentioned, there being a third radial passage in the cam shaft communicating with a passage through the hub of the cam shaft gear, said passage delivering the oil centrifugally out along a face of the gear and through a peripheral opening in the rim of the gear to lubricate the intermeshing gear surfaces of the two gears.

2. In an engine having a wall, a crank shaft journaled therein, a cam shaft journaled in a bearing in said wall, a gear on the crank shaft, a gear having a hub on the cam shaft, one of said shafts having an axial oil feed duct therethrough, the cam shaft provided with an annular groove in communication with said shaft duct, said groove communicating with a pocket in the cam shaft bearing, said pocket being in intermittent communication with a radial passage in the cam shaft, there being a second radial passage in the cam shaft communicating with a passage through the hub of the cam shaft gear, said passage delivering the oil centrifugally out along a face of the gear and through a peripheral opening in the rim of the gear to lubricate the intermeshing gear surfaces of the two gears.

3. In an engine having a wall, a crank shaft journaled therein, a cam shaft journaled in a bearing in said wall, a gear on the crank shaft, a gear having a hub on the cam shaft, said cam shaft having an axial oil feed duct therethrough, the cam shaft having a radial passage leading to an annular groove on the shaft, said groove intermittently communicating with a pocket in the cam shaft bearing, said pocket communicating with another radial passage leading back to the axial duct in the cam shaft, a division block between the two radial passages mentioned, there being a third radial passage in the cam shaft communicating with a passage through the hub of the cam shaft gear, said passage delivering the oil centrifugally out along a face of the gear and to an annular trough formed on the inner face of the rim of said gear, there being a radial opening in the rim of the gear from said trough to lubricate the intermeshing gear surfaces of the two gears.

In testimony whereof I affix my signature.

LEWIS H. MORRILL.